(12) United States Patent
Mikiya et al.

(10) Patent No.: US 7,001,117 B2
(45) Date of Patent: Feb. 21, 2006

(54) ROTARY CUTTING APPARATUS

(75) Inventors: Toshio Mikiya, Tokyo (JP); Keisuke Shimada, Tokyo (JP); Takashi Chiba, Tokyo (JP); Munenori Yamaguchi, Tokyo (JP); Kenji Ohtsuka, Tokyo (JP)

(73) Assignee: Nitto Kohki Co., Ltd., Tokyo (JP)

( * ) Notice: Subject to any disclaimer, the term of this patent is extended or adjusted under 35 U.S.C. 154(b) by 23 days.

(21) Appl. No.: 10/659,419

(22) Filed: Sep. 10, 2003

(65) Prior Publication Data
US 2004/0191018 A1 Sep. 30, 2004

(30) Foreign Application Priority Data
Mar. 28, 2003 (JP) ............................ 2003-091395
Jul. 2, 2003 (JP) ............................ 2003-270270

(51) Int. Cl.
*B23B 45/14* (2006.01)
(52) U.S. Cl. .................. 408/76; 408/88; 408/135; 408/141
(58) Field of Classification Search ............... 408/76, 408/88, 124, 135, 136, 141; 403/82, 399, 403/400; 409/231
See application file for complete search history.

(56) References Cited

U.S. PATENT DOCUMENTS

| | | | | |
|---|---|---|---|---|
| 1,868,440 A | * | 7/1932 | Arp | 408/83 |
| 2,647,407 A | * | 8/1953 | Hirvonen | 74/22 R |
| 2,748,630 A | | 6/1956 | Dillon | |
| 2,887,910 A | * | 5/1959 | Williamson, Jr. | 408/76 |
| 3,530,570 A | * | 9/1970 | Shotter | 483/8 |
| 3,596,558 A | * | 8/1971 | Rydell | 409/178 |
| 3,757,638 A | * | 9/1973 | Martin | 409/335 |
| 3,791,755 A | * | 2/1974 | Warren | 408/76 |
| 3,796,506 A | * | 3/1974 | Buck | 408/76 |
| 3,803,927 A | * | 4/1974 | Lawler | 74/89.31 |
| 4,483,334 A | * | 11/1984 | Murray | 606/59 |
| 4,626,152 A | | 12/1986 | Palm | |
| 5,025,548 A | | 6/1991 | Justesen | |
| 5,282,704 A | * | 2/1994 | Screen | 408/124 |
| 5,342,153 A | * | 8/1994 | Dobkins | 408/1 R |
| 5,632,577 A | | 5/1997 | Peroni | |
| 5,902,076 A | | 5/1999 | Miller et al. | |
| 6,102,633 A | * | 8/2000 | Uehlein-Proctor | 408/141 |
| 6,280,123 B1 | * | 8/2001 | Gill | 408/76 |
| 2004/0047698 A1 | * | 3/2004 | Omi | 408/141 |

(Continued)

FOREIGN PATENT DOCUMENTS

EP 1 099 518 A2 5/2001

(Continued)

*Primary Examiner*—Boyer D. Ashley
*Assistant Examiner*—Michael W. Talbot
(74) *Attorney, Agent, or Firm*—Brinks Hofer Gilson & Lione (57) ABSTRACT

A rotary cutting apparatus comprises a rotary shaft assembly having an axis and adapted to hold a cutting tool coaxial with the axis and, a feed mechanism for moving the cutting tool held by the rotary shaft assembly along the axis of the rotary shaft assembly. The rotary shaft assembly comprises a proximal rotary shaft, an intermediate, a distal rotary shaft which are successively telescopically connected, and a cylindrical housing rotatably holding the distal rotary shaft and movable along the axis together with the distal rotary shaft. The feed mechanism comprises a first rack mounted on the cylindrical housing and extending in parallel with the axis of the rotary shaft assembly, a second rack securely mounted on the body in parallel with the first rack; and, a pinion positioned between and engaged with the first and second racks.

18 Claims, 8 Drawing Sheets

U.S. PATENT DOCUMENTS

2004/0223820 A1 * 11/2004 Shieh .......................... 408/76

FOREIGN PATENT DOCUMENTS

| JP | 32-000586 | 2/1957 |
| JP | 48-33486 | 5/1973 |
| JP | 61-003544 | 2/1986 |
| JP | H8-090324 | 4/1996 |
| JP | H8-155712 | 6/1996 |

* cited by examiner

ROTARY CUTTING APPARATUS

BACKGROUND

The present invention relates to a rotary cutting apparatus. More specifically, the present invention relates to a drill which, although compact, is capable of feeding a cutting tool a relatively long distance (or cutting stroke).

Drills may be used on a variety of sites in connection with plant building, shipbuilding, bridge building and so on and, therefore, it is desirable that they are compact and lightweight.

It is generally conventional that a drill has a cutting tool, a feed mechanism for feeding the cutting tool and a motor for driving the cutting tool, all of which are linearly arranged.

To meet the above requirements, a drill has been developed in which a motor is positioned in such a manner that the output shaft thereof is normal to an axis along which a cutting tool and a feed mechanism are arranged. This type of drill can achieve a low profile or a compact size as compared with the above-mentioned conventional ones.

However, when those skilled in the art try to make a drill compact, there is the problem that the mechanism for feeding a cutting tool is also required to be shorter and more compact, which results in a shortened cutting stroke. Such is the case with the newly developed drill mentioned above.

BRIEF SUMMARY

Accordingly, it is an object to provide a cutting apparatus which can feed a longer distance even when the cutting apparatus is compact.

According to the present invention, there is provided a rotary
cutting apparatus comprising:
a body;
a motor mounted on the body;
a rotary shaft assembly having an axis and adapted to hold a cutting tool coaxial with the axis; and,
a feed mechanism for moving the cutting tool held by the rotary shaft assembly along the axis of the rotary shaft assembly.

The rotary shaft assembly comprises:
a proximal rotary shaft concentric with the axis of the rotary shaft assembly and mounted on the body for rotation about the axis, the proximal rotary shaft being drivingly connected to the motor;
an intermediate rotary shaft telescopically connected to the proximal rotary shaft to axially move relative to the proximal rotary shaft between an extended position and a retracted position, the intermediate rotary shaft being rotatable together with the proximal rotary shaft;
a distal rotary shaft telescopically connected to the intermediate rotary shaft to axially move relative to the intermediate rotary shaft between an extended position and a retracted position, the distal rotary shaft being rotatable together with the intermediate rotary shaft; and,
a cylindrical housing rotatably holding the distal rotary shaft and being movable along the axis of the rotary shaft assembly together with the distal rotary shaft.

The feed mechanism has a drive member engaged with the cylindrical housing and movable in parallel with the axis above to bring the rotary shaft assembly to an extended position wherein the intermediate and distal rotary shafts are in the extended positions thereof and to a retracted position wherein the intermediate and distal rotary shafts are in the retracted positions thereof.

The telescopic structure of the rotary shaft assembly of this cutting apparatus makes it possible for a cutting tool to attain a long cutting stroke even when the rotary shaft assembly is short or of a compact size when in the retracted position, thereby enabling the rotary cutting apparatus to also be of a compact size.

The feed mechanism may comprise:
a first rack mounted on the cylindrical housing and having a column of teeth extending in parallel with the axis of the rotary shaft assembly and facing radially outwardly relative to the axis;
a second rack securely mounted on the body and having a column of teeth extending in parallel with the column of teeth with a space interposed therebetween; and,
a pinion positioned between and engaged with the columns of teeth of the first and second racks.

This double track mechanism makes it possible for the first or movable rack to move relative to the second or stationary rack through a long distance for every rotation of the pinion as compared with a single track mechanism where a pinion is rotatably provided on a stationary side and a movable rack is engaged with the pinion and is advanced by rotation of the pinion. The double track mechanism makes it possible for the first or movable track to be short to thereby contribute to a shortening of the cutting apparatus.

The rotary cutting apparatus may comprise an electrically magnetic base which supports the body in such a manner that the rotary shaft assembly is movable on a plane normal to the axis of the rotary shaft assembly. The magnetic base magnetically adheres thereto a workpiece which is subjected to cutting operation and the body is thereafter moved to bring the tip end of the cutting tool to a proper position on the workpiece.

The pivot mechanism facilitates the bringing of the tip end of the cutting tool to a proper position on a workpiece which is subjected to cutting operation.

According to another aspect of the present invention, there is provided a rotary cutting apparatus in which a rotary shaft assembly having such a telescopic structure as stated above is itself movable along the axis of the rotary shaft assembly. Since the movement of the rotary shaft along the axis of the rotary shaft assembly takes part of the cutting stroke of the rotary shaft assembly, the rotary shaft assembly and/or the feed mechanism can be shortened and, as a result, the rotary cutting apparatus can also be shortened.

According to a further aspect of the present invention, there is provided a rotary cutting apparatus in which a body provided with such a rotary shaft assembly as described above and other elements such as a motor associated with the rotary shaft assembly is movable relative to a base in a direction parallel to the axis of the rotary shaft assembly. As in the case of the abovementioned rotary cutting apparatus, this feature also reduces the size thereof.

BRIEF DESCRIPTION OF THE DRAWINGS

Other objects and advantages of the present invention will be readily appreciated by reference to the following detailed description of preferred embodiments when considered in connection with the accompanied drawings wherein.

DETAILED DESCRIPTION OF THE DRAWINGS AND THE PRESENTLY PREFERRED EMBODIMENTS

Figure 1:
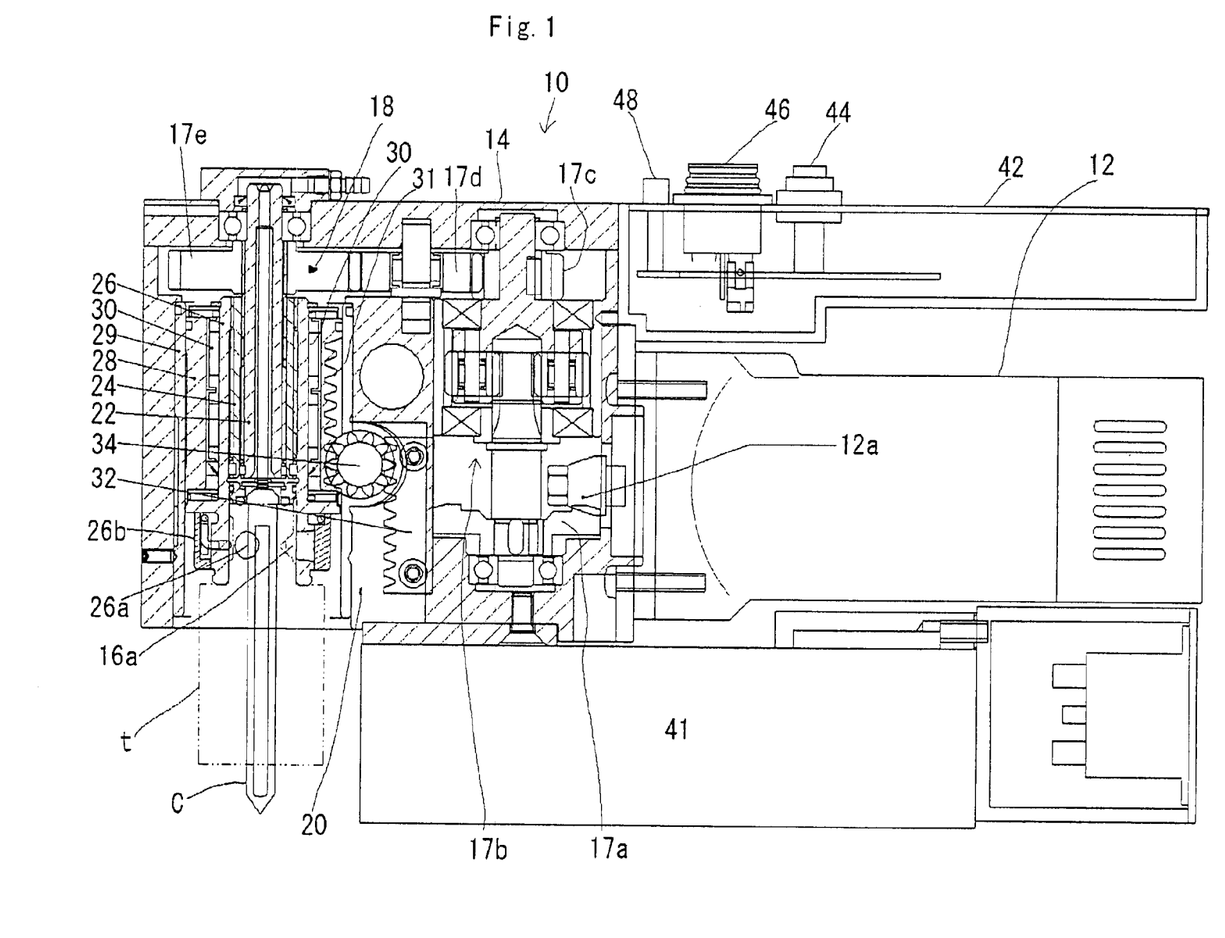
FIG. 1 is a cross-sectional side elevation view of a rotary cutting apparatus in accordance with a first embodiment of the present invention.
Figure 2:
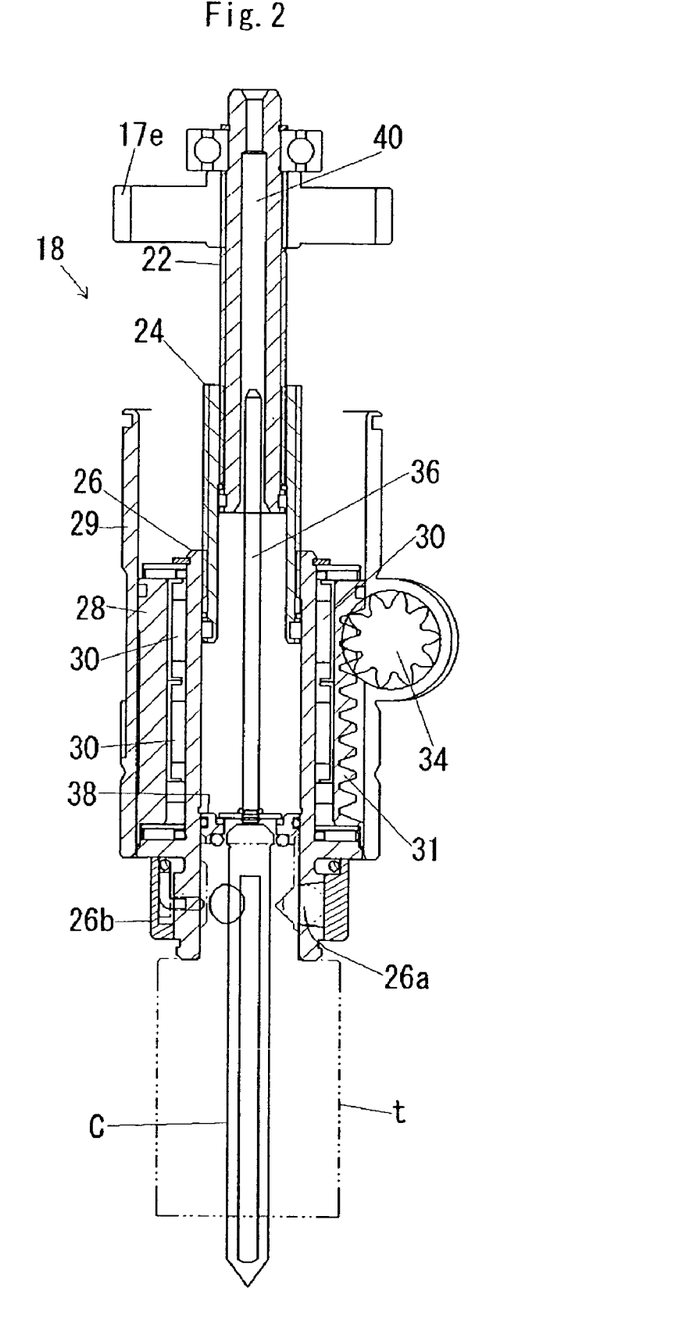
FIG. 2 is a cross-sectional side elevation view of a rotary shaft assembly employed in the rotary cutting apparatus of FIG. 1.

With reference to FIGS. 1 and 2, a rotary cutting apparatus or drill in accordance with a first embodiment of the present invention is shown generally at 10. The drill 10 has a body 14 provided with a motor 12, a rotary shaft assembly 18 drivingly connected to an output shaft 12a of the motor 12 through a bevel gear 17a, a planetary gear speed reducer 17b, and spur gears 17c, 17d, 17e, and a feed mechanism 20 for moving a cutting tool t (i.e., in the illustrated embodiment, an annular or cylindrical cutting tool having a circular cross-section) along an axis of the rotary shaft assembly 18.

As clearly shown in FIG. 2, the rotary shaft assembly 18 comprises a proximal rotary shaft 22 rotatably supported by the body 14 to be rotatable about the axis of the rotary shaft assembly and provided with the spur gear 17e, an intermediate rotary shaft 24 telescopically connected to the proximal rotary shaft 22, a distal rotary shaft 26 telescopically connected to the intermediate rotary shaft 24, and a holding cylinder 28 for rotatably holding the distal rotary shaft 26 therein and movable along the axis of the rotary shaft assembly together with the distal rotary shaft 26. The proximal rotary shaft 22 has a plurality of splines formed on the outer surface thereof and extending along the axis of the proximal rotary shaft. The intermediate rotary shaft 24 is cylindrical and has a plurality of splines on the inner surface thereof which slidingly mate with the splines of the proximal rotary shaft. The intermediate rotary shaft 24 is axially movable relative to the proximal rotary shaft 22 between an extended position (shown in FIG. 2) and a retracted position (shown in FIG. 1). The distal rotary shaft 26 is cylindrical and has a plurality of splines on the inner surface thereof which slidably mate with a plurality of splines formed on the outer surface of the intermediate rotary shaft 24. The distal rotary shaft is axially movable relative to the intermediate rotary shaft between an extended position (shown in FIG. 2) and a retracted position (shown in FIG. 1). The holding cylinder 28 is supported by a guide cylinder 29 securely connected to the body 14 in such a manner that the holding cylinder 28 is prevented from being rotated about the axis thereof but is permitted to move along the axis. In FIGS. 1 and 2, reference numeral 30 donates needle bearings positioned between the distal rotary shaft 26 and the holding cylinder 28, and reference numerals 26a, 26b denotes rocking balls for locking the cutting tool t to the distal rotary shaft 26 and a sleeve for operating the locking ball 26a, respectively.

The feed mechanism 20 comprises a linear movable rack 31 fixed to the outer surface of the holding cylinder 28 and extending in parallel to the axis of the rotary shaft assembly, a linear stationary rack 32 secured to the body 14 in parallel to the movable rack 31 with a space interposed therebetween, and a pinion 34 positioned between and engaged with the movable and stationary racks 31 and 32.

In the drill described above, the rotary shaft assembly 18 is in a retracted position as shown in FIG. 1 when the drill is in a non-cutting operation. During an operation, the cutting tool t is rotatably driven by the motor 12 through the rotary shaft assembly 18 and, simultaneously the pinion 34 is rotated in a counter-clockwise direction as viewed in FIG. 1 by a lever (not shown) provided at one end of a central shaft of the pinion 34 extending outside the body 14. The pinion 34 is thus advanced along the stationary rack 32 downwards and, in turn, the movable rack 31 is moved downwards by the rotating pinion 34. FIG. 2 shows the rotary shaft assembly 18 in the extended position wherein the pinion 34 is positioned at the uppermost position of the movable rack 31 (although not shown, at the lowermost position of the stationary rack 32), and the intermediate rotary shaft 24 and the distal rotary shaft 26 are in the extended positions thereof, the cutting tool t being, as a result, brought to the lowest position thereof. In FIG. 2, a workpiece to be subjected to cutting operation has not been set or positioned relative to the rotary shaft assembly 18 and, accordingly, a center pin c of the cutting tool is maintained in the position shown in FIG. 2 without being shifted upwards from the shown position. Otherwise, the center pin c is moved up by a workpiece set for cutting operation, whereby a shank-type valve 36 is moved up and away from a valve seat 38 formed on the inner surface of the distal rotary shaft 26 to thereby permit lubricant supplied from lubricant source (not shown) fluidly connected to the top end of a lubricant passage 40 formed in the proximal rotary shaft 22 to be supplied to the cutting tool t.

On the underside of the body, there is provided a magnetic base 41 containing an electrical magnet (not shown) therein. The magnetic base 41 magnetically adheres a workpiece thereto to set or position the workpiece relative to the rotary shaft assembly 18 for a drilling operation. It is preferable that the body 14 with the rotary shaft assembly is movable relative to the base 41 on a plane normal to the axis of the rotary shaft assembly 18 to enable the tip of the cutting tool t to be readily positioned relative to the workpiece after the base 41 is securely attached to the workpiece.

Figure 5:
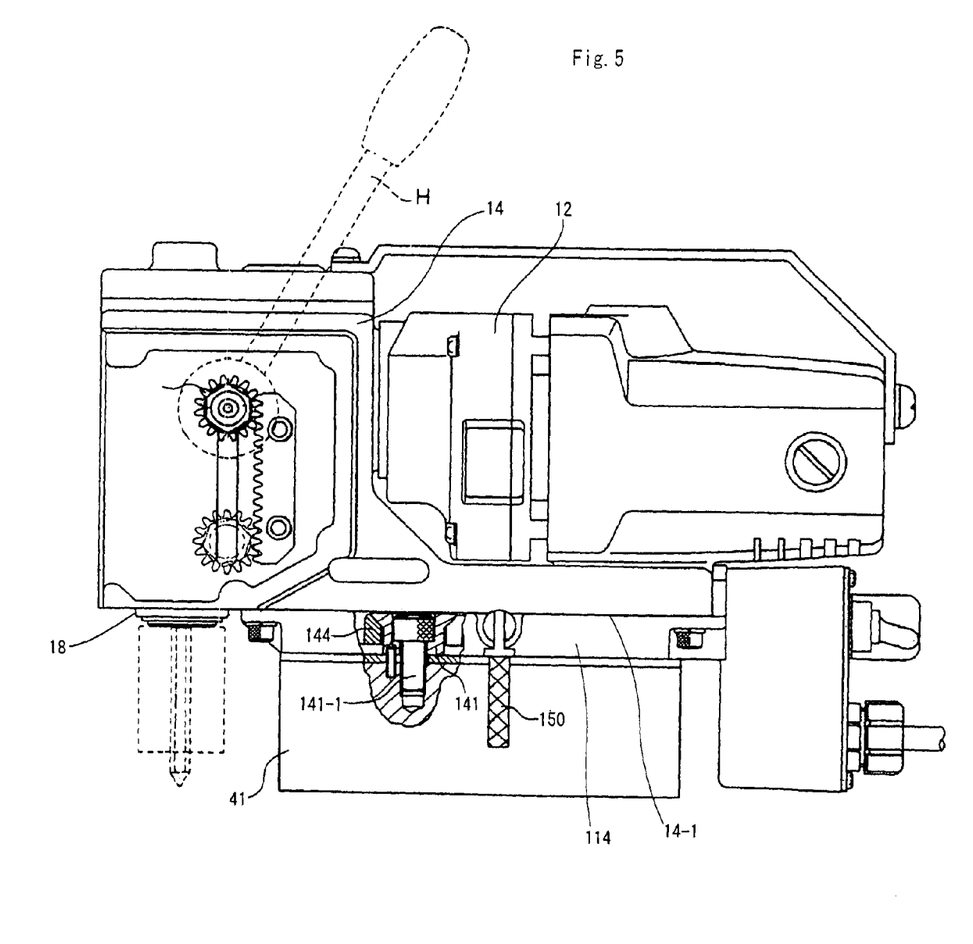
FIG. 5 is a side elevation view of a drill similar to that of FIG. 1, a portion of which is shown as a partial cross section view.
Figure 6A:
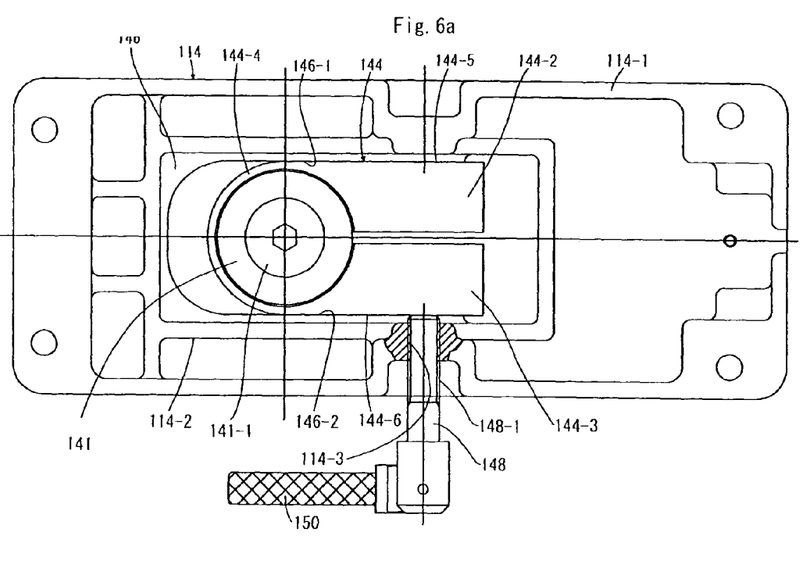
FIG. 6a is a plan view of a mechanism for fastening a body of the drill to a base employed in the drill of FIG. 5, the mechanism being in a non-fastening mode; and, FIG. 6b is a view similar to FIG. 6a showing the mechanism in a fastening mode.
Figure 6B:
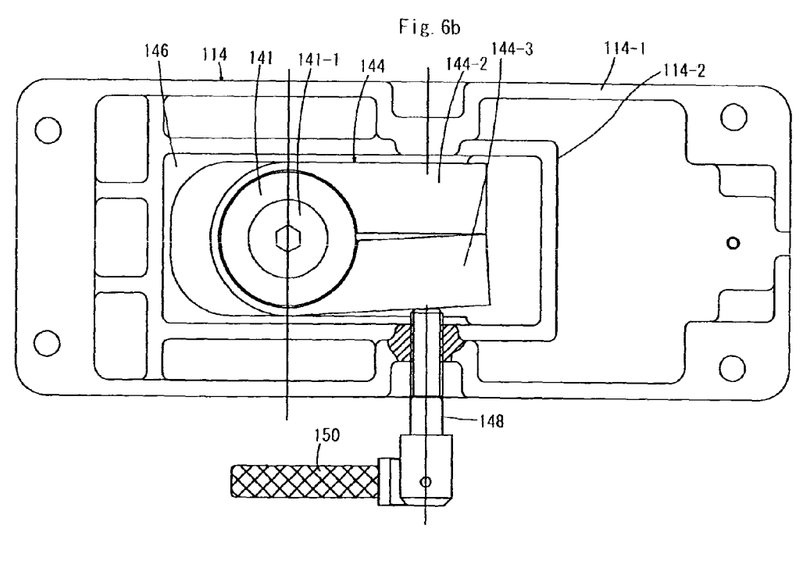

FIGS. 5, 6a and 6b show a drill similar to the drill of FIG. 1 and having a mechanism whereby the body 14 with the rotary shaft assembly 18 can be moved on the base 41 and, then, fixed on the base. Specifically, the mechanism comprises a pivot member 141 fixed on the upper surface of the base 41 by a fastening bolt 141-1, a rectangular frame 114, which is generally rectangular as viewed in FIG. 6a and which is positioned between the body 14 and the base 41 and fixedly connected on the lower surface 14-1 of the body 14, and a fastening member 144 having a generally U-shape as viewed in FIG. 6a constituted of a pair of legs 144-2, 144-3 and an arched center portion 144-4 connecting legs 144-2, 144-3 and surrounding the pivot member 141. As shown in FIGS. 6a and 6b, the frame 114 has an outer rectangular portion 114-1 and an inner rectangular portion 114-2. As shown in FIG. 6a, on the inner surface of the inner rectangular portion 114-2 is formed a guide portion 146 in a generally U-shape having a pair of inside parallel surfaces 146-1, 146-2 and the fastening member 144 is positioned inside the guide portion 146 with the outer surfaces 144-5, 144-6 of the legs 144-2, 144-3 slidably engaged with the inside parallel surfaces 146-1, 146-2 of the guide member 146, respectively. The rectangular frame 114 is thus horizontally movable relative to the fastening member 144 in such a manner that the inside parallel surfaces 146-1, 146-2 of the guide portion 146 slide on the corresponding outer surfaces 144-5, 144-6 of the fastener member 144. The mechanism further comprises a fastening bolt 148 having a male screw thread 148-1 formed thereon which is threadably engaged with a female screw hole 114-3 formed through one side wall of the outer rectangular portion 114-1. In FIG. 6a, legs 144-2 and 144-3 of the fastening member 144 extend in parallel with each other, and in this case, the arched center portion 144-4 loosely fits around the pivot member 141 and, thus, the fastening member 144 is rotatable about the pivot member 141, whereby the rectangular frame 114 fixedly connected to the body 14 is rotatable about the pivot member 141 and horizontally movable on the base 41. By rotating the fastening screw bolt 148 by a handle 150 connected to the outer end of the bolt 148, the fastening bolt 148 can be advanced with the tip end of the fastening bolt 148 kept in engagement with the leg 144-3 of the fastening member 144, finally bringing the fastening member 144 into a condition as shown in FIG. 6b under which the legs 144-2 and 144-3 are forcibly engaged with each other and are firmly clamped between the tip end of the fastening bolt 148 and one side wall of the guide portion 146 to thereby clamp the pivot member 141 by means of the fastening member 144 and be fixed to the rectangular frame 114. Thus, the body 14 is fastened to the base 41.

In the embodiment, the motor 12 is fixedly mounted on the body 14 in such a manner that the output shaft thereof is positioned horizontally or perpendicularly to the axis of the rotary shaft assembly and a handle 42 is positioned above the motor and securely connected to the body 14. On the upper surface of the handle are provided a switch 44 of the motor 12, a switch 46 of the electric magnet of the magnet base 41, and a light emitting diode (LED) 48 for indicating a status of load imposed on the drill. Instead of the single light emitting diode, a plurality of LEDs can be provided to each indicate an appropriate load status, an overload status, and so on.

Figure 3A:
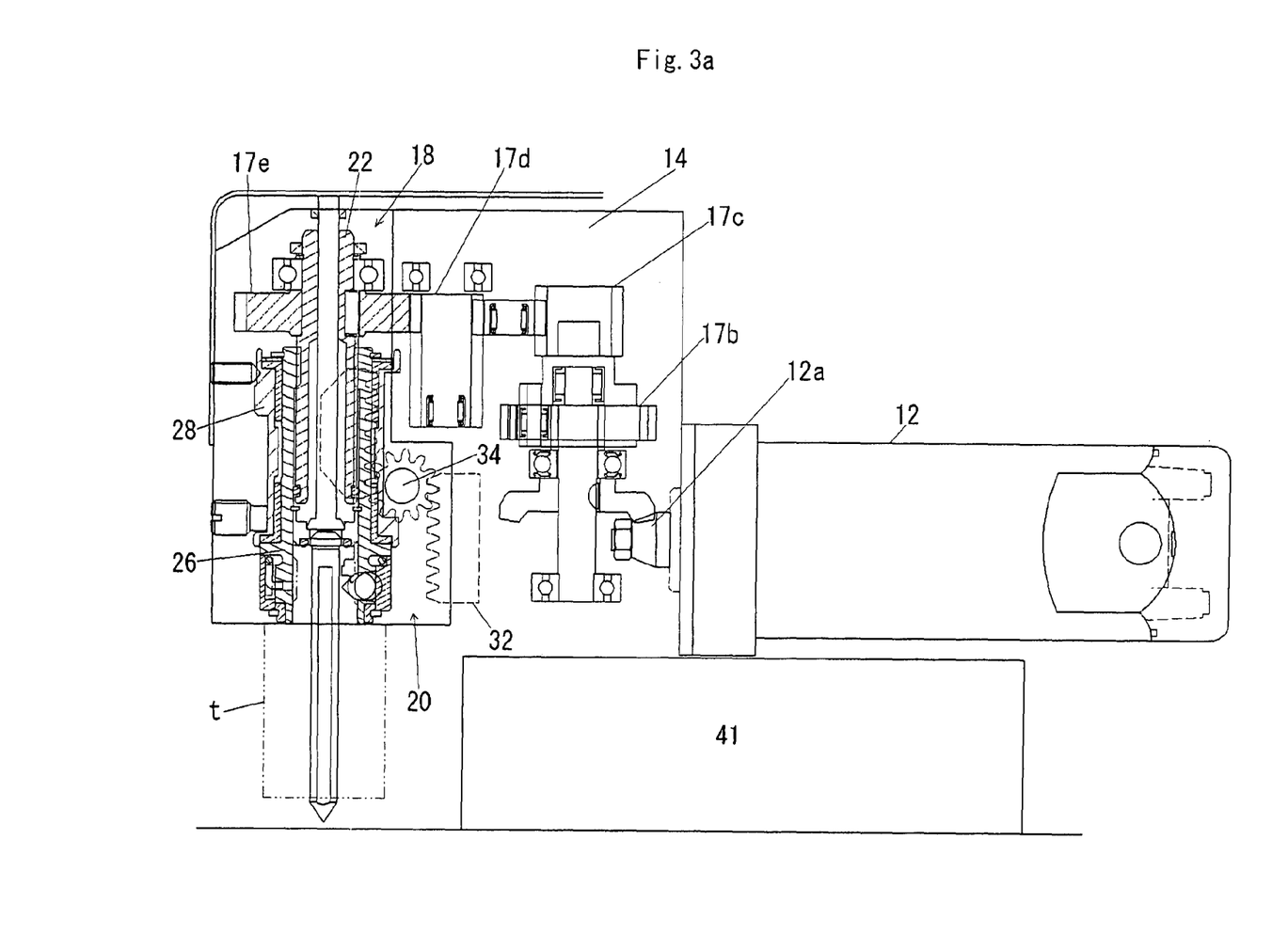
FIG. 3a is a side elevation view of a rotary cutting apparatus in accordance with a second embodiment of the present invention a portion of which is shown as a cross-section view, the rotary shaft assembly of the apparatus being in a retracted position.
Figure 3B:
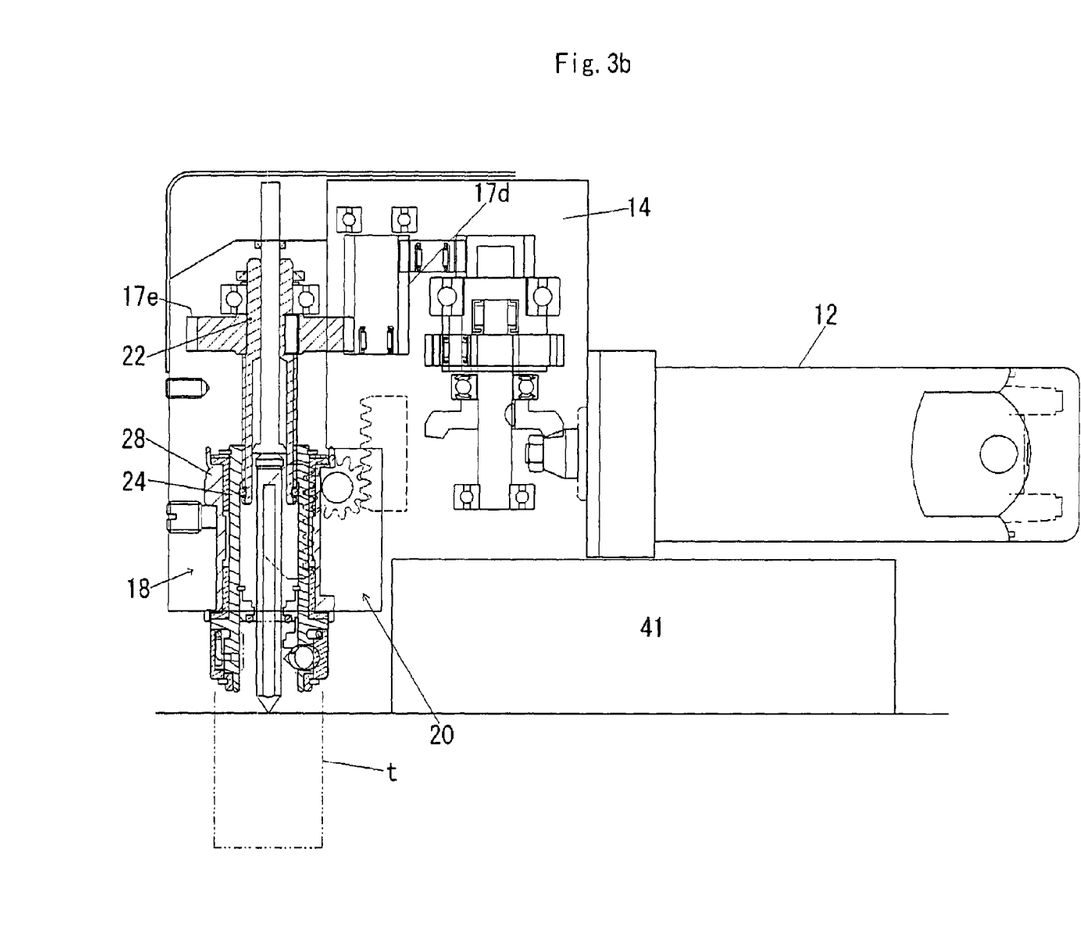
FIG. 3b is a view similar to FIG. 3a showing that the rotary shaft assembly of the rotary cutting apparatus is in an extended position.

FIGS. 3a and 3b illustrate a drill in accordance with another embodiment of the present invention. In terms of structure, the drill is generally the same as the first embodiment of the present invention, and like elements are denoted by the same reference numbers.

A distinguishable feature of the drill is that a rotary shaft assembly 18 comprises a proximal rotary shaft 22 and a distal rotary shaft 26 which is in a telescopic-spline-connection relationship with the proximal rotary shaft 22, without interposing any intermediate rotary shaft between the proximal and distal rotary shafts 22 and 26. Further, a spur gear 17d of a gear train drivingly connecting an output shaft 12a of a motor 12 and the proximal rotary shaft 22 has a longer axial length and the rotary shaft assembly 18 is movable as a whole along the axis thereof relative to a body 14 so that a spur gear 17e fixed to the proximal rotary shaft 22 and engaged with the spur gear 17d can be kept in engagement with the spur gear 7d as the rotary shaft assembly is moved relative to the body. Therefore, during an operation, the proximal and distal rotary shafts 22 and 26 of the rotary shaft assembly 18 are always kept rotated in a cutting operation in which the rotary shaft assembly 18 is moved up and down.

Figure 4A:
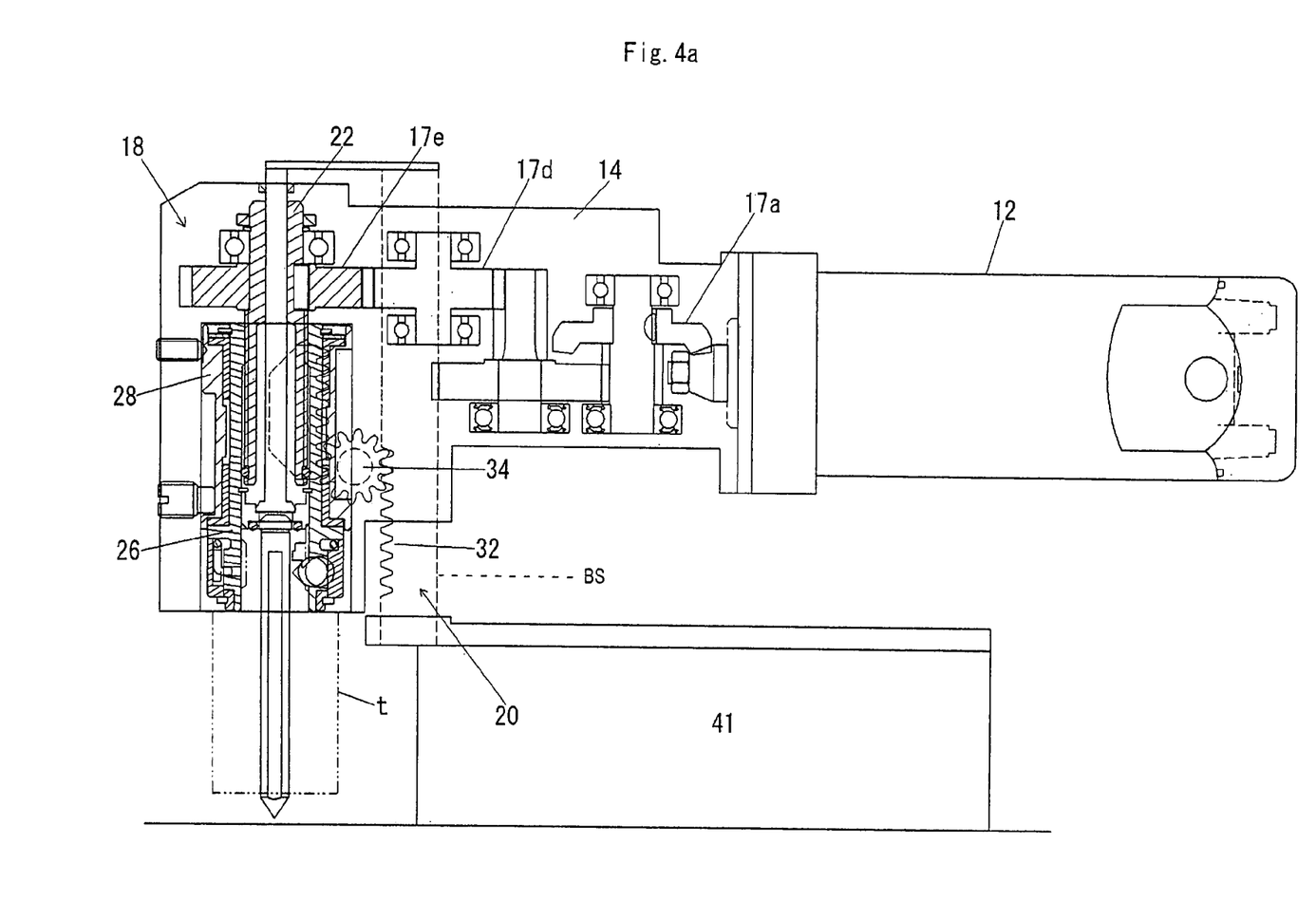
FIG. 4a is a side elevation view of a rotary cutting apparatus in accordance with a third embodiment of the present invention a portion of which is shown as a cross-section view, the rotary shaft assembly of the apparatus being in a retracted position.
Figure 4B:
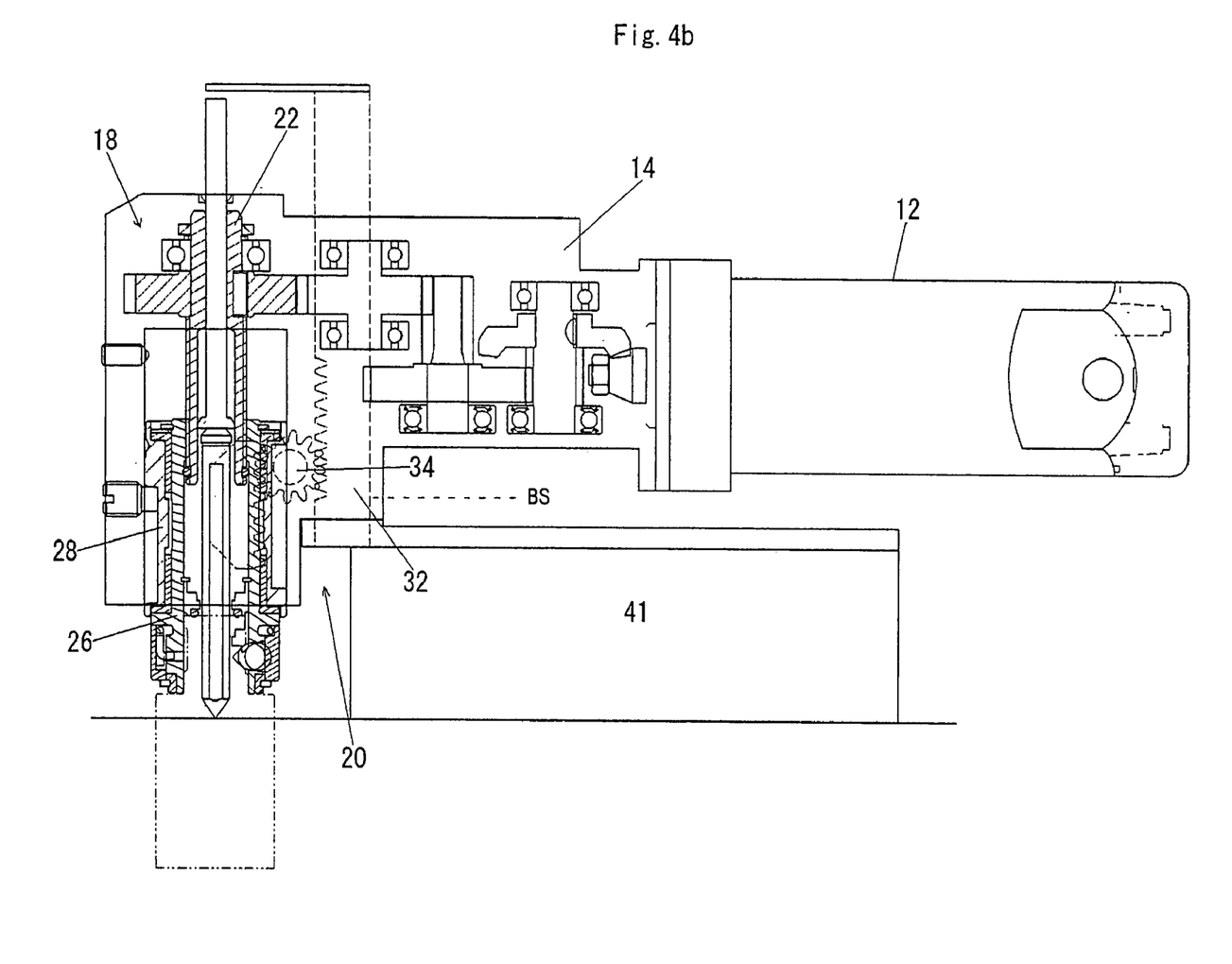
FIG. 4b is a view similar to FIG. 4a showing the rotary shaft assembly of the rotary cutting apparatus in an extended position.

FIGS. 4a and 4b illustrate a drill in accordance with a third embodiment of the present invention.

A distinguishable feature of the drill is that a body 14 is movable up and down relative to a magnetic base 41. In the drill, a body support (BS) is provided on the base to support the body 14 for movement in a vertical direction or an up and down direction and a stationary rack 32 is also fixed to the body support (BS). Thus, in operation, the pinion 34 is rotated to move along the stationary rack 32, whereby the rotary shaft assembly 18 is extended or contracted and the rotary shaft assembly 18 is itself moved up and down.

The invention has been described in an illustrative manner, and it is to be understood that the terminology that has been used is intended for the purpose of description and is not to be in any way limiting.

Obviously, many modifications and variations of the present invention are possible in light of the above teachings. It is, therefore, to be understood that within the scope of the appended claims, the invention may be practiced in a manner other than that specifically described.

What is claimed is:

1. A rotary cutting apparatus comprising:
    a body;
    a motor mounted on said body;
    a rotary shaft assembly having an axis and adapted to hold a cutting tool coaxial with said axis; and,
    a feed mechanism for moving said cutting tool along said axis between an extended position and a retracted position,
    wherein said rotary shaft assembly comprises:
    a proximal rotary shaft that is mounted coaxially with said axis on said body for rotation about said axis, said proximal rotary shaft being drivingly connected to said motor;
    an intermediate rotary shaft that is connected coaxially and telescopically to said proximal rotary shaft for axial movement between them but for no relative rotation therebetween, whereby said intermediate rotary shaft rotates together with said proximal rotary shaft;
    a distal rotary shaft that is connected coaxially and telescopically to said intermediate rotary shaft for axial movement between them but no relative rotation therebetween, whereby said distal rotary shaft rotates together with said intermediate rotary shaft; and,
    a cylindrical housing that rotatably houses said distal rotary shaft for no relative axial movement between said cylindrical house and said distal rotary shaft such that said cylindrical housing moves axially together with said distal rotary shaft, and
    further wherein said feed mechanism comprises:
    a first rack that is fixedly mounted on said cylindrical housing and has a column of teeth arranged along said axis;
    a second rack that is fixedly mounted on said body and has a column of teeth arranged along said axis opposite to the teeth of said first rack; and
    a pinion that is positioned in engagement with the teeth of both said first and second racks, said pinion being axially movable relative to each of said first and second racks, whereby rotation of said pinion causes relative axial movement between said body and said pinion and further relative axial movement between the pinion and said cylindrical housing.

2. A rotary cutting apparatus as set forth in claim 1, wherein
said motor has an output shaft extending normal to the axis of said rotary shaft assembly.

3. A rotary cutting apparatus as set forth in claim 2, wherein
said rotary cutting apparatus comprises a magnetic base having an electrical magnet; and,
said body is mounted on said magnetic base such that said rotary shaft assembly is movable on a plane normal to said axis of said rotary shaft assembly.

4. A rotary cutting apparatus as set forth in claim 3, wherein
said magnetic base has a pivot member having an axis parallel to said axis of said rotary shaft assembly;
said body is rotatable about said pivot member; and,
said rotary cutting apparatus further comprises a fastener for fixing said body at a desired angular position about said pivot member.

5. A rotary cutting apparatus as set forth in claim 4 wherein,
said fastening member has a pair of leg portions and an intermediate portion positioned between said leg portions and surrounding said pivot member, said leg portions each having inner and outer surfaces, said inner surfaces of said leg portions being spaced away from and facing each other;
said body has a guide member having side portions between which said leg portions are positioned and which slidably engage said outer surfaces of said leg portions so that said body with the guide member is movable on said plane along said leg portions; and,
said fastening member further has a fastening bolt laterally extending through and threadably engaged with one of said side portions of said guide member, said fastening bolt having an inner or tip end engaged with one of said outer surfaces of said leg portions in such a manner that, when the fastening bolt is rotated about its axis to advance inwardly, the tip end of said fastening bolt urges one of said leg portions, which has said one of said outer surfaces, towards the other leg portion and finally presses both of the leg portions against the other side portion of said guide member, whereby the intermediate portion of said fastening member is tightened to be firmly engaged with said pivot member and, thus, the body is fixedly secured to said magnetic base.

6. A rotary cutting apparatus comprising:
a body;
a motor mounted on said body;
a rotary shaft assembly having an axis and adapted to hold a cutting tool coaxial with said axis; and,
a feed mechanism for moving said cutting tool along said axis between an extended position and a retracted position,
wherein said rotary shaft assembly comprises:
a proximal rotary shaft that is mounted coaxially with said axis on said body for rotation about said axis and drivingly connected to said motor;
a distal rotary shaft that is coaxial with said axis, said distal rotary shaft being rotated about said axis by said proximal rotary shaft and axially movable relative to said proximal shaft; and a cylindrical housing coaxial with said axis, said cylindrical housing that rotatably houses said distal rotary shaft for no relative axial movement between said cylindrical housing and said distal rotary shaft such that said cylindrical housing moves axially together with said distal rotary shaft, and
further wherein said feed mechanism comprises:
a first rack that is fixedly mounted on said cylindrical housing and has a column of teeth arranged along said axis of said rotary shaft assembly;
a second rack that is fixedly mounted on said body and has a column of teeth arranged along the axis opposite to said teeth of said first rack; and,
a pinion that is positioned in engagement with the teeth of both said first and second racks, said pinion being axially movable relative to each of said first and second racks, whereby rotation of said pinion causes relative axial movement between said body and said pinion and further relative axial movement between the pinion and said cylindrical housing.

7. A rotary cutting apparatus as set forth in claim 6, wherein
said rotary cutting apparatus comprises a magnetic base having an electrical magnet; and,
said body is mounted on said magnetic base such that said rotary shaft assembly is movable on a plane normal to said axis of said rotary shaft assembly.

8. A rotary cutting apparatus as set forth in claim 7, wherein
said magnetic base has a pivot member having an axis parallel to said axis of said rotary shaft assembly;
said body is rotatable about said pivot member and has a fastening member for fixing said body at a desired angular position about said pivot member.

9. A rotary cutting apparatus as set forth in claim 8 wherein,
said fastening member has a pair of leg portions and an intermediate portion positioned between said leg portions and surrounding said pivot member, said leg portions each having inner and outer surfaces, said inner surfaces of said leg portions being spaced away from and facing each other;
said body has a guide member having side portions between which said leg portions are positioned and which slidably engage said outer surfaces of said leg portions so that said body with the guide member is movable on said plane along said leg portions; and,
said fastening member further has a fastening bolt laterally extending through and threadably engaged with one of said side portions of said guide member, said fastening bolt having an inner or tip end engaged with one of said outer surfaces of said leg portions in such a manner that, when the fastening bolt is rotated about its axis to advance inwardly, the tip end of said fastening bolt urges one of said leg portions, which has said one of said outer surfaces, towards the other leg portion and finally presses both of the leg portions against the other side portion of said guide member, whereby the intermediate portion of said fastening member is tightened to be firmly engaged with said pivot member and, thus, the body is fixedly secured to said magnetic base.

10. A rotary cutting apparatus comprising:
a body;
a motor mounted on said body;
a rotary shaft assembly having an axis of rotation and a distal end adapted to hold a cutting tool coaxial with said axis, said rotary shaft assembly being mounted on said body such that said rotary shaft assembly is movable along said axis; and, a feed mechanism for moving said cutting tool along said axis between an extended position and a retracted position, wherein said rotary shaft assembly comprises:

a proximal rotary shaft that is coaxial with said axis, said proximal rotary shaft being drivingly connected to said motor to be rotated about said axis and movable along said axis;

a distal rotary shaft that is coaxial with said proximal rotary shaft and adapted to hold said cutting tool, said distal rotary shaft being rotated about said axis by said proximal rotary shaft and axially movable relative to said proximal rotary shaft; and a cylindrical housing that rotatably houses said distal rotary shaft or no relative axial movement between said cylindrical housing and said distal rotary shaft such that said cylindrical housing moves axially together with said distal rotary shaft, and further wherein said feed mechanism comprises:

a first rack that is fixedly mounted on said cylindrical housing and has a column of teeth arranged along said axis;

a second rack that is fixedly mounted on said body and has a column of teeth arranged along said axis opposite to the teeth of said first rack; and, a pinion that is positioned in engagement with the teeth of both said first and second racks, said pinion being axially movable relative to each of said first and second racks, whereby rotation of said pinion causes relative axial movement between said body and said pinion and further relative axial movement between the pinion and said cylindrical housing, wherein rotation of said pinion causes axial movement of said rotary shaft assembly in its entirety between said retracted position and said extended position.

11. A rotary cutting apparatus as set forth in claim 10, wherein said rotary cutting apparatus comprises a gear train positioned between said motor and said distal rotary shaft; and, said gear train comprises;

a first spur gear coaxial with and secured to said proximal rotary shaft; and, a second spur gear engaged with said first spur gear, wherein said second spur gear has an axial length so that said first spur gear will stay engaged with said second spur gear when said proximal rotary shaft is moved axially, together with the first spur gear secured thereto.

12. A rotary cutting apparatus as set forth in claim 10, wherein said rotary cutting apparatus comprises a magnetic base having an electrical magnet;

said motor has an output shaft extending normal to said proximal rotary shaft; and, said body is mounted on said magnetic base such that said rotary shaft assembly is movable on a plane normal to said axis of said rotary shaft assembly.

13. A rotary cutting apparatus as set forth in claim 12, wherein said magnetic base has a pivot member having an axis parallel to said axis of said rotary shaft assembly;

said body is rotatable about said pivot member; and, said rotary cutting apparatus further comprises a fastening member for fixing said body at a desired angular position about said pivot member.

14. A rotary cutting apparatus as set forth in claim 13 wherein, said fastening member has a pair of leg portions and an intermediate portion positioned between said leg portions and surrounding said pivot member, said leg portions each having inner and outer surfaces, said inner surfaces of said leg portions being spaced away from and facing each other;

said body has a guide member having side portions between which said leg portions are positioned and which slidably engage said outer surfaces of said leg portions so that said body with the guide member is movable on said plane along said leg portions; and, said fastening member further has a fastening bolt laterally extending through and threadably engaged with one of said side portions of said guide member, said fastening bolt having an inner or tip end engaged with one of said outer surfaces of said leg portions in such a manner that, when the fastening bolt is rotated about its axis to advance inwardly, the tip end of said fastening bolt urges one of said leg portions, which has said one of said outer surfaces, towards the other leg portion and finally presses both of the leg portions against the other side portion of said guide member, whereby the intermediate portion of said fastening member is tightened to be firmly engaged with said pivot member and, thus, the body is fixedly secured to said magnetic base.

15. A rotary cutting apparatus comprising:

a base for fastening said rotary cutting apparatus at a desired position; and, a body that is mounted on said base such that said body is movable along an axis relative to said base, wherein said body comprises:

a motor that is mounted on said body;

a rotary shaft assembly that rotates around said axis and is adapted to hold a cutting tool coaxial with said axis; and, a feed mechanism for moving said cutting tool along said axis between an extended position and a retracted position wherein said rotary shaft assembly comprises:

a proximal rotary shaft that is coaxial with said axis, said proximal rotary shaft being drivingly connected to said motor to be rotated about said axis;

a distal rotary shaft that is coaxial with said proximal rotary shaft and adapted to hold said cutting tool, said distal rotary shaft being rotated about said axis by said proximal rotary shaft and axially movable relative to said proximal rotary shaft; and a cylindrical housing that rotatably houses said distal rotary shaft for no relative axial movement between the cylindrical housing and said distal rotary shaft such that said cylindrical housing moves axially together with said distal rotary shaft, and further wherein said feed mechanism comprises:

a first rack that is fixedly mounted on said cylindrical housing and has a column of teeth arranged along said axis of said rotary shaft assembly;

a second rack that is fixedly mounted on said base and has a column of teeth arranged along said axis opposite to the teeth of said first rack; and, a pinion that is positioned in engagement with the teeth of both said first and second racks, said pinion being axially movable relative to each of said first and second racks, whereby rotation of said pinion causes relative axial movement between said base and said pinion and further relative axial movement between the pinion and said cylindrical housing.

16. A rotary cutting apparatus as set forth in claim 15, wherein said rotary cutting apparatus comprises a magnetic base having an electrical magnet;

said motor having an output shaft extending normal to said rotary shaft assembly; and, said body is mounted on said magnetic base such that said rotary shaft assembly is movable on a plane normal to said axis of said rotary shaft assembly.

17. A rotary cutting apparatus as set forth in claim 16, wherein said magnetic base has a pivot member having an axis parallel to said axis of said rotary shaft assembly;

said body is rotatable about said pivot member and has a fastening member for fixing said body at a desired angular position about said pivot member.

18. A rotary cutting apparatus as set forth in claim 17 wherein, said fastening member has a pair of leg portions and an intermediate portion positioned between said leg portions and surrounding said pivot member, said leg portions each having inner and outer surfaces, said inner surfaces of said leg portions being spaced away from and facing each other;

said body has a guide member having side portions between which said leg portions are positioned and which slidably engage said outer surfaces of said leg portions so that said body with the guide member is movable on said plane along said leg portions; and, said fastening member further has a fastening bolt laterally extending through and threadably engaged with one of said side portions of said guide member, said fastening bolt having an inner or tip end engaged with one of said outer surfaces of said leg portions in such a manner that, when the fastening bolt is rotated about its axis to advance inwardly, the tip end of said fastening bolt urges one of said leg portions, which has said one of said outer surfaces, towards the other leg portion and finally presses both of the leg portions against the other side portion of said guide member, whereby the intermediate portion of said fastening member is tightened to be firmly engaged with said pivot member and, thus, the body is fixedly secured to said magnetic base.

* * * * *